United States Patent
Jie

(10) Patent No.: US 9,812,936 B2
(45) Date of Patent: Nov. 7, 2017

(54) DRIVE MOTOR WITH MASTER-SLAVE FLYWHEEL

(71) Applicant: Dai Jie, Yangzhou (CN)

(72) Inventor: Dai Jie, Yangzhou (CN)

( * ) Notice: Subject to any disclaimer, the term of this patent is extended or adjusted under 35 U.S.C. 154(b) by 445 days.

(21) Appl. No.: 14/422,069

(22) PCT Filed: Dec. 10, 2012

(86) PCT No.: PCT/CN2012/086273
§ 371 (c)(1),
(2) Date: Feb. 17, 2015

(87) PCT Pub. No.: WO2014/029180
PCT Pub. Date: Feb. 27, 2014

(65) Prior Publication Data
US 2015/0171720 A1 Jun. 18, 2015

(30) Foreign Application Priority Data
Aug. 21, 2012 (CN) ..................... 2012 2 0417203 U

(51) Int. Cl.
*H02K 7/02* (2006.01)
*H02K 7/20* (2006.01)
(Continued)

(52) U.S. Cl.
CPC ............... *H02K 16/00* (2013.01); *H02K 7/02* (2013.01); *H02K 7/11* (2013.01); *H02K 7/20* (2013.01); *H02P 5/00* (2013.01); *Y02E 60/16* (2013.01)

(58) Field of Classification Search
CPC ............ H02K 7/02; H02K 16/00; F16F 15/31
(Continued)

(56) References Cited

U.S. PATENT DOCUMENTS 5,400,582 A * 3/1995 Hartmeier ................ D01H 1/32
57/264
7,536,932 B1 * 5/2009 Brown ..................... F16C 15/00
310/74

(Continued)

FOREIGN PATENT DOCUMENTS

CN 1314242 A 9/2001
GB 2353146 A * 2/2001 ............. H02K 7/025
(Continued)

*Primary Examiner* — Jose Gonzalez Quinones
(74) *Attorney, Agent, or Firm* — Andrew W. Chu; Craft Chu PLLC

(57) ABSTRACT

The present invention relates to a master-slave flywheel drive motor, including a shaft, master motor, master flywheel, slave motor bracket, outer rotor of slave motor and drive connector, slave motor coil winding and magnet wheel. The master motor, master flywheel, slave motor bracket, outer rotor of slave motor and drive connector are sequentially fitted over the shaft. The slave motor coil winding and magnet wheel are sequentially fitted over the outside of the master motor. There is a slave motor three-phase electrode fixed boss on the master flywheel, the three-phase electrode fixed boss being integrally formed with the master flywheel. There is no shifting mechanism in the drive motor, taking advantage of the inertia of the flywheel, so as to reduce power consumption when start-up and to achieve a CVT transmission torque energy recycle function by regenerative current controlling of the slave motor.

5 Claims, 1 Drawing Sheet

(51) Int. Cl.
*H02K 16/00* (2006.01)
*F16F 15/31* (2006.01)
*H02K 7/11* (2006.01)
*H02P 5/00* (2016.01)

(58) Field of Classification Search
USPC ............... 310/70 R, 74, 112, 114; 74/572.1, 74/572.21
See application file for complete search history.

(56) References Cited

U.S. PATENT DOCUMENTS

2009/0174271 A1* 7/2009 Lin .................. H02K 1/146
310/153
2010/0147165 A1* 6/2010 Masaki .................. H02K 7/02
100/214

FOREIGN PATENT DOCUMENTS

| JP | 04174948 A | * | 6/1992 |
| JP | 2001268822 A | * | 9/2001 |
| JP | 2005341743 A | | 12/2005 |

* cited by examiner

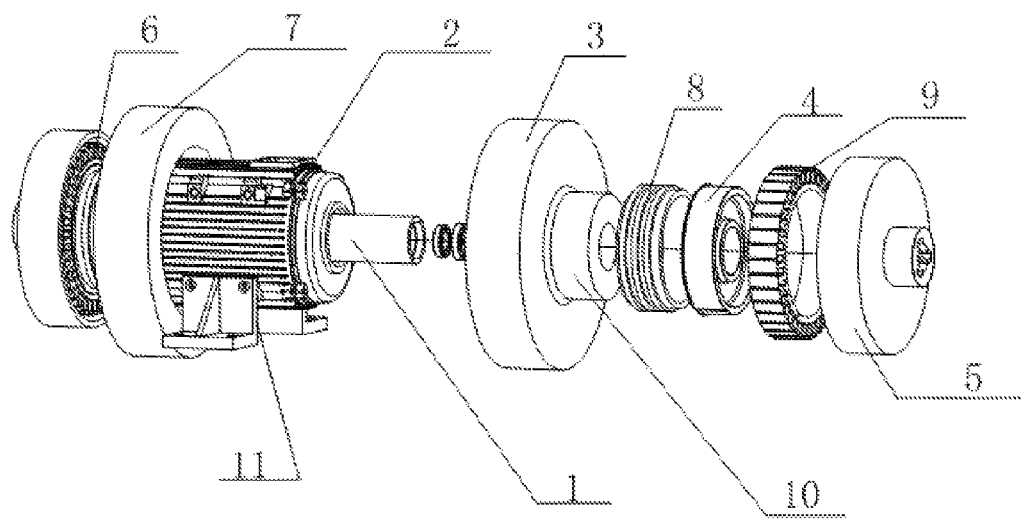

DRIVE MOTOR WITH MASTER-SLAVE FLYWHEEL

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to a drive motor, more particularly to a master-slave flywheel drive motor.

2. Description of Related Art Including Information Disclosed Under 37 CFR 1.97 and 37 CFR 1.98

Currently most of pure electric vehicle drive motors use variable speed mechanical design, mechanical transmission and gearbox is big and heavy, low mechanical efficiency and large loss.

SUMMARY OF THE INVENTION

Technical problems to be solved by the present invention is to provide a master-slave flywheel drive motor to address the problem of current drive motor and gearbox in big and heavy, low mechanical efficiency and large loss.

The present invention solves the above technical problems the technical solution as follows: a master-slave flywheel drive motor, including a shaft, master motor, master flywheel, slave motor bracket, outer rotor of slave motor and drive connector, slave motor coil winding and magnet wheel. The master motor, master flywheel, slave motor bracket, outer rotor of slave motor and drive connector are sequentially fitted over the shaft, slave motor coil winding and magnet wheel are sequentially fitted over the outside of the master motor.

Furthermore, there is a slave motor three-phase electrode fixed boss on the master flywheel, the three-phase electrode fixed boss integrally formed with the master flywheel.

Furthermore, the drive motor includes slave motor three-phase electrodes and stator, the slave motor stator is fitted over the slave motor bracket, the slave motor three-phase electrodes are fitted over the fixed boss.

Furthermore, the three-phase electrodes number is 3.

Furthermore, there is heat dissipation structure on the master motor.

The beneficial effects of the present invention are: the drive motor without shifting mechanism can achieve the CVT function by regulating the motor current, and recover a part of the power. While the use of the drive motor inertia from flywheel supplements vehicle's requirement of high current supply for frequent start-up, that can reduce the current demand on the battery and minimize the risk of the large current damaging the electronic control system. Using the inertia of flywheel also reduce the battery power consumption to improve system security and reliability of vehicle, extending its life and achieve electromagnetic energy efficient CVT.

BRIEF DESCRIPTION OF THE DRAWINGS

The FIGURE is a schematic view of an embodiment of the present invention.

Each numeral list parts represented as follows:

1, Shaft, 2, Master motor, 3, Master flywheel, 4, Slave motor bracket, 5, Outer rotor of slave motor and drive connector, 6, Slave motor coil winding, 7, Magnet wheel, 8, Slave motor three-phase electrodes, 9, Slave motor stator, 10, Slave motor three-phase electrode fixed boss, 11, Heat dissipation structure invention.

DETAILED DESCRIPTION OF THE DRAWINGS

The principles and features of the present invention will be described, the examples only serve to illustrate the invention and are not intended to limit the scope of the invention.

A master-slave flywheel drive motor is shown in FIG. 1, includes shaft 1, master motor 2, master flywheel 3, slave motor bracket 4, outer rotor of slave motor and drive connector 5, slave motor coil winding 6 and magnet wheel 7. The master motor 2, master flywheel 3, slave motor bracket 4 and outer rotor of slave motor and drive connector 5 are sequentially fitted over the shaft 1. The slave motor coil winding 6 and magnet wheel 7 are sequentially fitted over the outside of master motor 2.

The master flywheel 3 with slave motor three-phase electrode fixed boss 10 on the side, the three-phase electrode fixed boss 10 integrally formed with the master flywheel 3.

The drive motor includes slave motor three-phase electrodes 8 and stator 9, the slave motor stator 9 is fitted over the slave motor bracket 4, the slave motor three-phase electrodes 8 are fitted over the fixed boss 10.

The three-phase electrodes 8 number is 3.

There is heat dissipation structure 11 on the master motor 2.

The above description presents a preferred embodiment of the present invention, which is not intended to limit the present invention, any modification within the spirit and principles of the present invention, equivalent replacement, improvement, etc., should be included in the protection range of the present invention.

I claim:

1. A master-slave flywheel drive motor comprising:
   a shaft,
   a master motor,
   a master flywheel,
   a slave motor bracket,
   an outer rotor of slave motor and drive connector,
   a slave motor coil winding, end
   a magnet wheel, wherein said master motor, said master flywheel, said slave motor bracket, said outer rotor of slave motor and drive connector are sequentially fitted over said shaft, and wherein said slave motor coil winding and said magnet wheel are sequentially fitted over an outside of said master motor.

2. The master-slave drive motor, according to claim 1, further comprising a slave motor three-phase electrode fixed boss on said master flywheel, said three-phase electrode fixed boss being integrally formed with said master flywheel.

3. The master-slave drive motor, according to claim 2, wherein said drive motor comprises slave motor three-phase electrodes and a stator, said stator being fitted over said slave motor bracket, said slave motor three-phase electrodes being fitted over the fixed boss.

4. The master-slave drive motor, according to claim 3, wherein said three-phase electrodes are comprised of three three-phase electrodes.

5. The master-slave drive motor, according to claim 1, further comprising a heat dissipation structure on said master motor.

* * * * *